Patented Apr. 5, 1932

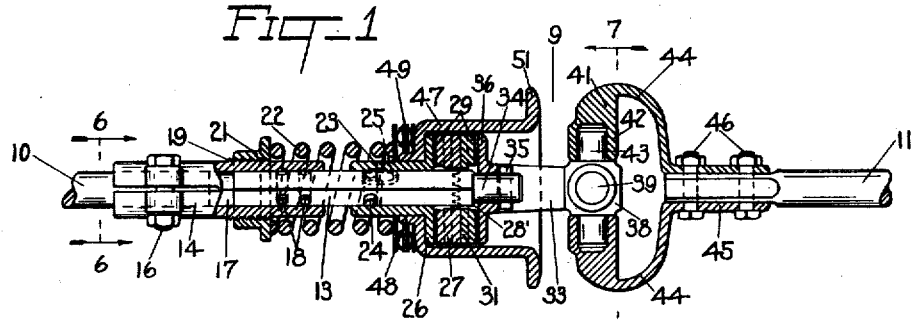

1,852,344

UNITED STATES PATENT OFFICE

WILBUR J. COULTAS AND NOLAN D. COLVIN, OF MOLINE, ILLINOIS, ASSIGNORS TO DEERE & COMPANY, OF MOLINE, ILLINOIS, A CORPORATION OF ILLINOIS

UNIVERSAL JOINT

Application filed January 23, 1928. Serial No. 243,677.

The present invention relates to universal joints for connecting driving and driven shafts and other power transmitting parts.

As is well known, the conventional type of universal joint is only capable of transmitting power efficiently through a limited angle of deflection of the coupling members constituting the joint, and when the deflection is increased beyond this limited working angle the universal joint begins to vibrate successively and to slow down in speed. Moreover, if the angle of deflection is still further increased, the universal joint becomes positively locked against rotation, with the consequent possibility of breakage of the operating parts in the driving train.

The primary object of the present invention is to provide an improved construction of universal joint which will operate automatically to interrupt the transmission of driving torque through the joint when the angle of deflection thereof approaches or exceeds the safe working angle of the joint. A universal joint of the above description has particular utility in power take-off mechanisms such as are used extensively in power farming operations to transmit power from the engine of the farm tractor directly to an operating mechanism or mechanisms on the agricultural implement which is being propelled thereby. Such power take-off mechanisms generally comprise a power shaft extending between the vehicles and having a universal joint therein to permit relative angulation between the shaft sections in the steering movement of the tractor. It frequently happens in prior forms of such power take-off mechanisms that a sharp turning movement of the tractor imposes an excessive angle of deflection on the universal joint, with the result that the latter vibrates excessively or becomes locked against rotation. It will be evident that the use of the present type of universal joint in such mechanisms will avoid this condition, since the transmission of driving torque through the joint will be automatically interrupted at such time until the two shaft sections are returned to the safe working angle of the joint.

A further object of the invention is to combine an overload relief function with the universal joint, so that in the event of an excessive load being placed upon the driven mechanism of the driving train, the transmission of power through the universal joint will be automatically interrupted, irrespective of the working angle of the joint.

The feature of having the transmission of power through the universal joint interrupted when the joint is deflected to the limit of its safe working angle constitutes the principal utility of the present construction. Nevertheless, it will be understood that this same characteristic operation may be employed in a control relation for starting and stopping the operation of driven parts connected with the shafting. For example, in agricultural implements the raising of the soil tilling devices to an inoperative position, or the lowering of such tilling devices to an operative position, may be utilized to control the inclination of the driven shaft section of the universal joint and thereby control the transmission of power to operating mechanisms of the implements.

Other objects and advantages of the invention will appear in the following description of a preferred embodiment thereof.

In the accompanying drawings illustrating such embodiment:

Fig. 1 is a longitudinal sectional view through the present mechanism;

Fig. 2 is a view showing the clutch parts in elevation, and illustrating the clutch released by the angulation of the universal joint;

Fig. 3 is an elevational view showing the recessed face of the driving member of the clutch, corresponding approximately to an end view thereof taken on the plane of the line 3—3 of Fig. 2;

Fig. 4 is an elevational view of the rear side of one of the clutch discs;

Fig. 5 is an elevational view of the opposite or toothed side of one of the clutch discs;

Fig. 6 is an end view of the mechanism, corresponding to a section taken on the plane of the line 6—6 of Fig. 1; and Fig. 7 is a sectional view through the universal joint, taken approximately on the plane of the line 7—7 of Fig. 1.

The universal joint 9 is illustrated as being interposed in a line of shafting represented by the two shafts 10 and 11. The clutch mechanism which interrupts the transmission of power through the universal joint is preferably interposed between the universal joint and the driving shaft, such driving shaft being represented by the shaft 10. It is conceivable that the clutch mechanism might be interposed between the universal joint and the driven shaft, but the operation thereof would not be as satisfactory as in the former relation, and it will therefore be assumed that the clutch is interposed between the driving shaft and the universal joint. Extending coextensively from the end of the driving shaft 10 is a shaft section 13, which may be considered as a continuation of the driving shaft. This latter shaft section is of square or polygonal cross-section, and is rigidly coupled to the driving shaft 10 through a sleeve 14. One end of said sleeve is split for detachable clamping about the round end of the driving shaft through clamping bolts 16 and the other end of the sleeve 14 has a socket 17 of square or polygonal cross-section in which the correspondingly formed end of the shaft section 13 is rigidly secured by pins 18. The outer surface of the sleeve is threaded as indicated at 19 to receive an internally threaded collar 21 which affords an adjustable stop for the rear end of a clutch spring 22. Slidably mounted on the shaft extension 13, in spaced relation to the sleeve 14, is a second sleeve 23 having a square or polygonal bore so that it rotates with the shaft extension 13. The sliding movement of said sleeve along the shaft extension is limited by a pin 24 extending through the shaft and having its ends engaging in longitudinal slots 25 in the sleeve. Formed at the front end of the shiftable sleeve is a radially extending flange 26 arranged to transmit rotation to the driving clutch disc 27. As shown in Fig. 3, the front face of the flange 26 is provided with a plurality of radially extending recesses 28, and, as shown in Fig. 4, the corresponding side of the clutch disc 27 is formed with a plurality of radially extending driving keys, or ribs 29 adapted to engage in said recesses, whereby the driving clutch disc rotates with the sleeve 23. The driving clutch disc engages with a driven clutch disc 31, which is substantially a counterpart or duplicate of the driving clutch disc, and which is rotatably mounted on the end of the shaft section 13.

As shown in Figs. 2 and 5, the opposing faces of said clutch discs are formed with teeth or serrations 32 which extend radially of the face of each disc. Such teeth or serrations are formed as symmetrical projections and indentations having rounded end surfaces and relatively obtuse side surfaces, which are preferably case hardened to withstand wear. The teeth on the opposing clutch surfaces are adapted to mesh or match with each other, and when so engaged under the pressure of the spring 22 they are capable of transmitting a relatively heavy driving torque. However, when overload slippage does occur, these surfaces will ride over each other without destructive wear or vibration. The rotation of the driven clutch disc 31 is transmitted to a yoke 33, which constitutes one of the coupling members of the universal joint 9. As shown in Fig. 1, such yoke member has a central hub portion which is rotatably mounted on a reduced cylindrical portion 34 projecting from the end of the shaft extension 13, the yoke member being held thereon by a pin 35 which passes through the end of the cylindrical bearing portion 34. Said yoke member is formed with a radially extending flange 36 in the inner face of which is formed a plurality of radially extending recesses 28', similar to the recesses 28 in the flange 26, the driving keys 29 of the driven clutch disc 31 engaging in such recesses 28'. The two arms of the yoke embrace opposite sides of a pivot block 38, with which the arms have pivotal connection through trunnion pins 39. The driven element of the universal joint 9 comprises an annular member 41, from which pivot bosses 42 extend inwardly at diametrically opposite points, as best shown in Fig. 7. Such pivot bosses engage over trunnion pins 43 which project from the knuckle block 38 at right angles to the trunnion pins 39. Extending rearwardly from the ring-like member 41 are two arms 44 having hub sections 45 at their ends which are rigidly secured to the driven shaft 11 by bolts 46.

Extending over and enclosing the two clutch discs 27 and 31 is a cup-shaped shell or housing 47, which constitutes one of the clutch releasing members. The closed end of said shell has a cylindrical bearing boss 48 which establishes a rotatable bearing support for the shell on the cylindrical outer surface of the shiftable sleeve 23. The pressure of the spring 22 is imparted to the end wall of the shell 47, the latter thence transmitting said pressure to the flange 26 of the shiftable sleeve. A ball bearing or other suitable type of antifriction thrust bearing 49 is preferably interposed between the end of the spring 22 and the end wall of the shell, such bearing being supported on the bearing boss 48. This antifriction bearing permits the spring to revolve freely with respect to the shell 47 when the clutch is disengaged, as will presently appear. The front or open end of the shell 47 is formed with an outwardly extending flange or lip 51, which is adapted to be engaged by the ring-like member 41 of the universal joint.

In the operation of the device, as long as the angular deflection of the universal joint is within the desired working limit of such joint, the two clutch discs 27 and 31 will be held in driving engagement under the pressure of the spring 22, and rotation will be transmitted through the universal joint to the driven shaft 11. However, when the driven shaft is inclined beyond this desired working angle, which usually corresponds to approximately 45 degrees, the annular portion 41 of the universal joint engages with the flange 51 of the shell and thrusts said shell rearwardly, thereby releasing the pressure of the spring 22 from the clutch discs. Thereupon, the sloping teeth of the two discs react on each other to cam the driving clutch disc out of meshing relation with the driven clutch disc, with the result that the transmission of rotation to the universal joint and to the driven shaft is interrupted. When the annular portion 41 of the universal joint first engages the flange 51, the two have rolling contact with each other, so that a smooth even motion is imparted to the shell 47 in releasing the spring pressure from the discs. After the discs have separated, the shell 47 stands idle with the annular member 41, the antifriction bearing 49 permitting the spring 22 to rotate with the driving shaft without rotating the shell. When the angle of deflection is restored to a point within the predetermined working limit of the joint, the shell 47 moves forwardly, permitting the pressure of the spring 22 to again engage the clutch discs and resulting in the universal joint resuming rotation.

It will be observed that the device also has an overload release function for preventing breakage or jamming of the parts in the event that an excessive load is placed upon the driven shaft. Under such condition, the sloping teeth of the two clutch discs react against each other to separate the discs in opposition to the pressure of the spring 22, thereby permitting relative slippage between the driving and driven shafts. It will be noted that this slippage action will occur upon overload, irrespective of the angle of the driven shaft 11. The device may be adjusted for slippage at any desired torque by screwing the collar 21 backwardly or forwardly along the sleeve 14, and thereby adjusting the pressure of the spring 22. In the event that one or both of the active clutch surfaces should become worn or broken, the same can be easily and quickly renewed by merely substituting the damaged clutch discs or disc. Hence, wear between the active clutch surfaces does not necessitate replacing the entire clutch, or renewing relatively expensive parts of its construction.

We claim:—

1. In combination, driving and driven elements, a universal joint carried by one element and connecting said elements to permit relative angulation therebetween, and means including a clutch carried by the other element and operated by said joint for interrupting the transmission of power to one of said elements when said elements are inclined at a predetermined angle.

2. In combination, driving and driven shafts, a universal joint carried by one shaft and connecting said shafts to permit relative angulation therebetween, and means including a clutch carried by the other shaft and operated by said joint for interrupting the transmission of power through said universal joint when said shafts are inclined at a predetermined angle.

3. In combination, driving and driven shafts, a universal joint carried by one shaft and connecting said shafts to permit relative angulation therebetween, a clutch carried by the other of said shafts, and means including a member of said universal joint cooperating with a member of said clutch for operating said clutch to automatically interrupt the transmission of power between said shafts when the angle of said universal joint exceeds the limit of a predetermined working angle for the joint.

4. In combination, driving and driven shafts, a universal joint for operatively connecting said shafts and adapted to permit relative angulation therebetween, a clutch interposed between one of said shafts and said universal joint, and means moving with the other of said shafts for releasing said clutch when said shafts are inclined at a predetermined angle.

5. In combination, driving and driven shafts, a universal joint for operatively connecting said shafts and adapted to permit relative angulation therebetween, a clutch interposed between said driving shaft and said universal joint, and means moving said driven shaft for releasing said clutch when said shafts are inclined at a predetermined angle.

6. In combination, driving and driven shafts, a universal joint for operatively connecting said shafts and adapted to permit relative angulation therebetween, a clutch interposed between one of said shafts and said universal joint, said clutch comprising two co-acting clutch surfaces, spring means normally operative to maintain said clutch surfaces in engagement, and means moving with the other of said shafts for automatically releasing the pressure of said spring from said clutch surfaces when said shafts are inclined at a predetermined angle.

7. In combination, driving and driven shafts, a universal joint for operatively connecting said shafts and adapted to permit relative angulation therebetween, a clutch interposed between one of said shafts and said universal joint, a thrusting member for releasing said clutch, and means moving with the other of said shafts adapted to engage said thrusting member when said shafts are inclined at a predetermined angle.

8. In combination, driving and driven shafts, a universal joint for operatively connecting said shafts and adapted to permit relative angulation therebetween, a clutch interposed between one of said shafts and said universal joint, a thrusting member movable longitudinally of said latter shaft and adapted to release said clutch, and an annular member rotating with the other of said shafts and adapted to engage said thrusting member when said shafts are inclined at a predetermined angle.

9. In combination, driving and driven shafts, a universal joint comprising two coupling members operatively connected to said shafts, a clutch interposed between one of said shafts and its associated coupling member, a shiftable member for releasing said clutch, and an annular surface on the other of said coupling members adapted to engage said shiftable member when said shafts are inclined at a predetermined angle.

10. In combination, driving and driven shafts, a universal joint comprising driving and driven coupling members operatively connected to said shafts, a clutch interposed between said driving shaft and said driving coupling member, a clutch releasing member shiftable longitudinally of said driving shaft, and an annular surface on said driven coupling member adapted to engage said clutch releasing member and to shift the latter to clutch releasing position when said shafts are relatively inclined at a predetermined angle.

11. In combination, driving and driven shafts, a universal joint comprising driving and driven coupling members, said driven coupling member being fixedly secured to said driven shaft, said driving coupling member being rotatably mounted on said driving shaft, a driven clutch element connected to said driving coupling member, a driving clutch element shiftable along said driving shaft and adapted to engage with said driven clutch element, a spring normally tending to hold said clutch elements engaged, a shell enclosing said clutch element, said shell being shiftable along said driving shaft for releasing the pressure of said spring from said clutch elements, and an annular surface on said driven coupling member adapted to engage the end of said shell for shifting the latter to clutch releasing position when said shafts are inclined at a predetermined angle relative to each other.

12. In a device of the class described, the combination of driving and driven shafts, a universal joint comprising driving and driven yokes pivotally coupled together, said driving yoke being rotatably supported on said driving shaft, said driven yoke being secured to said driven shaft, a sleeve slidably mounted on said driving shaft, a pair of co-acting clutch elements between said sleeve and said driven yoke, the driving clutch element being connected to said sleeve and the driven clutch element being connected to said yoke, a cup-shaped shell enclosing said clutch elements and rotatably mounted on said driving shaft, a compression spring transmitting pressure through said shell to said clutch elements, and an annular surface on said driven yoke adapted to engage the end of said shell when said shafts are inclined at a predetermined angle to each other for releasing the spring pressure from said clutch elements.

13. In a device of the class described, the combination of driving and driven shafts, a shaft extension for said driving shaft, a coupling sleeve for coupling said shaft extension to said driving shaft, a universal joint comprising driving and driven yoke members pivotally connected together, said driving yoke member being rotatably supported on said shaft extension, said driven yoke member being secured to said driven shaft, a shiftable sleeve non-rotatably supported on said shaft extension, a pair of co-acting clutch discs interposed between said shiftable sleeve and said driving yoke member, the opposing faces of said discs having sloping teeth therein for overload slippage driving engagement, the opposite faces of said discs having shoulders adapted to establish driving engagement with shoulders on said shiftable sleeve and on said driven yoke member, a cup-shaped shell enclosing said disc and having its rear end rotatably supported on said shiftable sleeve, a compression spring surrounding said shaft extension, an antifriction bearing interposed between one end of said spring and the rear end of said shell, the latter end of said shell transmitting the pressure of said spring to said shiftable sleeve, a stop collar against which the other end of said spring bears, said collar being shiftable relative to said coupling sleeve, an outwardly extending flange at the front end of said shell, and an annular surface on said driven yoke adapted to engage said flange for shifting said shell rearwardly when said shafts are inclined at a predetermined angle relative to each other.

14. In combination, driving and driven shafts, a joint connecting said shafts to permit relative angulation therebetween, a clutch automatically operated when an overload torque is placed on one of said shafts, and means for operating said clutch to interrupt the transmission of power to one of said shafts when said shafts are inclined at a predetermined angle.

15. In combination, driving and driven shafts, a universal joint connecting said shafts to permit relative angulation therebetween, a spring pressed slippage clutch interposed between one of said shafts and said universal joint and adapted to permit relative slippage between said shafts in the event of overload, and means for releasing said clutch when said shafts are inclined at a predetermined angle.

16. In combination, driving and driven shafts, a clutch in said driving shaft, a spring holding said clutch engaged, a housing around said clutch and engaging said spring, a universal joint comprising driving and driven yoke members pivotally connected together, and means comprising said driven yoke engaging said housing for releasing said clutch when the angle between said driving and driven shafts exceeds a given value.

In witness whereof, we hereunto subscribe our names this 10th day of January, 1928.

WILBUR J. COULTAS.
NOLAN D. COLVIN.

CERTIFICATE OF CORRECTION.

Patent No. 1,852,344.  Granted April 5, 1932, to

WILBUR J. COULTAS ET AL.

It is hereby certified that error appears in the printed specification of the above numbered patent requiring correction as follows: Page 3, line 107, claim 5, after the word "moving" insert the word with; and that the said Letters Patent should be read with this correction therein that the same may conform to the record of the case in the Patent Office.

Signed and sealed this 7th day of June, A. D. 1932.

M. J. Moore,
Acting Commissioner of Patents.

(Seal)

interposed between one of said shafts and said universal joint and adapted to permit relative slippage between said shafts in the event of overload, and means for releasing said clutch when said shafts are inclined at a predetermined angle.

16. In combination, driving and driven shafts, a clutch in said driving shaft, a spring holding said clutch engaged, a housing around said clutch and engaging said spring, a universal joint comprising driving and driven yoke members pivotally connected together, and means comprising said driven yoke engaging said housing for releasing said clutch when the angle between said driving and driven shafts exceeds a given value.

In witness whereof, we hereunto subscribe our names this 10th day of January, 1928.

WILBUR J. COULTAS.
NOLAN D. COLVIN.

CERTIFICATE OF CORRECTION.

Patent No. 1,852,344.  Granted April 5, 1932, to

WILBUR J. COULTAS ET AL.

It is hereby certified that error appears in the printed specification of the above numbered patent requiring correction as follows: Page 3, line 107, claim 5, after the word "moving" insert the word with; and that the said Letters Patent should be read with this correction therein that the same may conform to the record of the case in the Patent Office.

Signed and sealed this 7th day of June, A. D. 1932.

M. J. Moore,
Acting Commissioner of Patents.

(Seal)

CERTIFICATE OF CORRECTION.

Patent No. 1,852,344.  Granted April 5, 1932, to

WILBUR J. COULTAS ET AL.

It is hereby certified that error appears in the printed specification of the above numbered patent requiring correction as follows: Page 3, line 107, claim 5, after the word "moving" insert the word with; and that the said Letters Patent should be read with this correction therein that the same may conform to the record of the case in the Patent Office.

Signed and sealed this 7th day of June, A. D. 1932.

(Seal)

M. J. Moore,
Acting Commissioner of Patents.